3,529,005
SILICON-CONTAINING STEROIDS
Sandor Barcza, West Orange, N.J., assignor to Sandoz-Wander, Inc., Hanover, N.J., a corporation of Delaware
No Drawing. Filed May 13, 1968, Ser. No. 728,802
Int. Cl. C07d 103/02
U.S. Cl. 260—448.2                                9 Claims

ABSTRACT OF THE DISCLOSURE

The compounds are steroids having the 6-carbon atom replaced by a silicon atom and are useful as estrogenic agents. The compounds may be prepared by a multistep process employing as starting materials an m-(lower)alkoxyphenyl halide, a di(lower)alkyldihalosilane, an allyl halide, a vinyl-organo-metallic reagent and a 2-(lower)alkyl-cyclopentane-1,3-dione.

---

This invention relates to tetracyclic compounds containing a silicon atom and more particularly to steroids wherein the 6-carbon atom is replaced by a silicon atom; said compounds being represented structurally by the Formula I

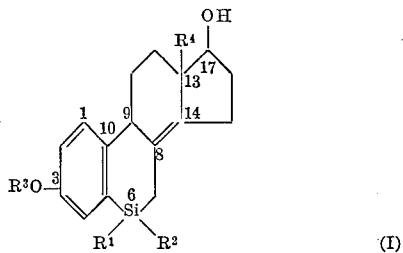

wherein:

each of $R^1$ and $R^2$ is, independently, lower alkyl, e.g., having from 1 to 4 carbon atoms, such as methyl, ethyl, propyl and butyl; and $R^3$ is lower alkyl, e.g., having from 1 to 4 carbon atoms, such as methyl, ethyl, propyl or butyl; and $R^4$ is alkyl having from 1 to 3 carbon atoms, i.e., methyl, ethyl, propyl or isopropyl.

This invention also relates to the preparation of compounds I and intermediates in the preparation of compounds I, and the preparation of such intermediates.

Compounds I are obtainable by reduction of appropriate intermediates as illustrated by the following reaction scheme A wherein $R^1$, $R^2$, $R^3$ and $R^4$ are as defined above.

REACTION SCHEME A

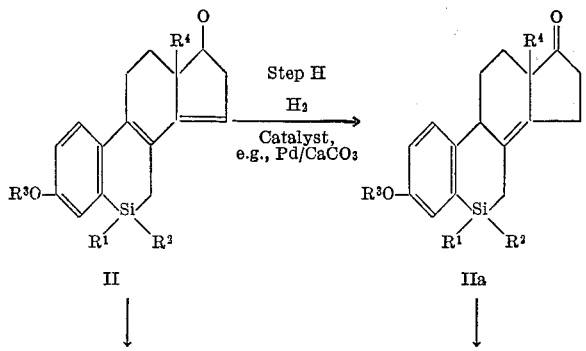

The reduction of a compound II to its corresponding compound IIb, i.e. Step H', or reduction of a compound IIa to its corresponding compound I, i.e. Step H''', may be carried out by conventional means for reducing a cabonyl to a hydroxyl. The reduction may be carried out by employing, for example, sodium borohydride in an inert solvent, e.g., a mixture of an alkanol and an aromatic hydrocarbon, preferably methanol and toluene, at relatively low temperatures, e.g., from $-60°$ to $+20°$ C.

The reduction of a compound II to its corresponding compound IIa, i.e. Step H, or the reduction of a compound IIb to its corresponding compound I, i.e. Step H'', may be carried out by conventional means for reducing an ethylenically unsaturated position, e.g., hydrogenation employing a catalyst, such as palladium on charcoal or calcium carbonate, in a suitable solvent, such as ethanol, dioxane, cyclohexane or benzene, at a temperature of from 0° to 50° C., preferably at 20° C.

It is preferred to first reduce a compound II to its corresponding compound IIb which is then reduced to its corresponding compound I, in the manner described above.

Compounds II are obtainable by a series of steps starting from an appropriate "silatetralone," i.e. a compound III (III)

wherein $R^1$, $R^2$ and $R^3$ are as defined above. The steps involved in preparing a compound II may be represented by the following Reaction Scheme B, wherein $R^1$, $R^2$, $R^3$ and $R^4$ are as defined above, and "alk" signifies a lower alkyl function, e.g., having from 1 to 4 carbon atoms, preferably methyl.

REACTION SCHEME B

"silatetralone"
(III)

(IV)

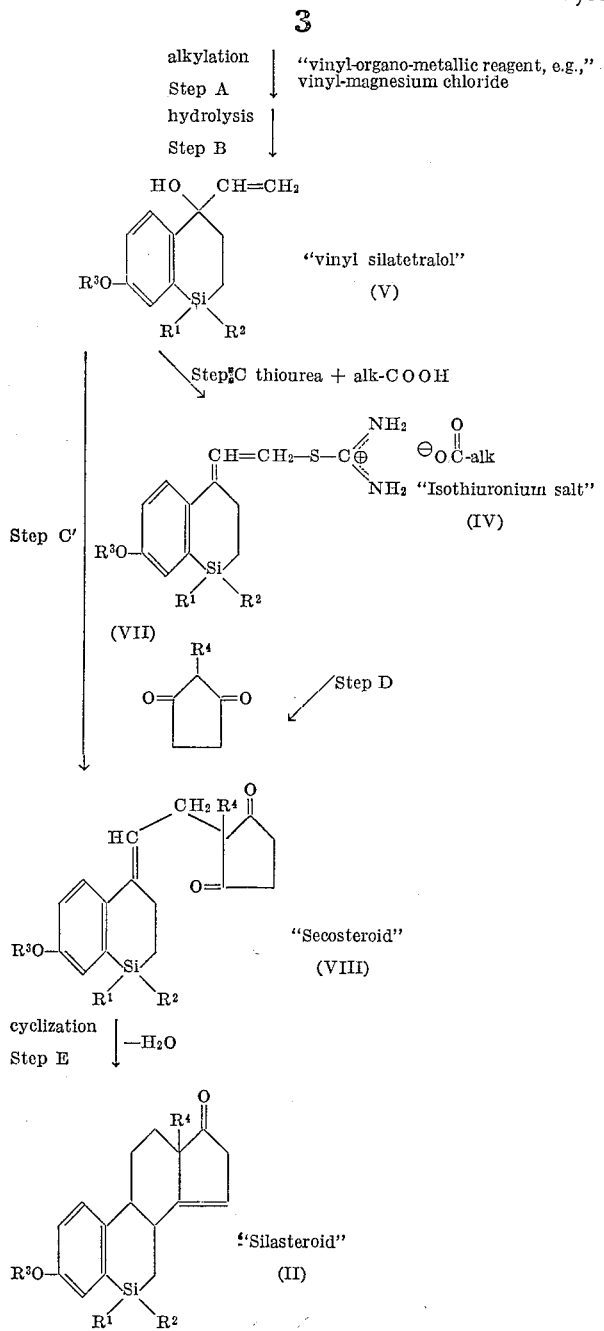

organic solvent, such as benzene from the hydrolysis mixture. Compounds V are sensitive to heat and acid and should not be heated above 40° C., should be stored at −20° and preferably are immediately used for subsequent reactions steps.

In Step A a significant portion of the "silatetralone" reactant may be converted to an enolate by-product. In Step B any such enolate present is hydrolyzed to the starting material (compound III) thus, diminishing the yield of the desired compound V. Accordingly, it is preferred to recover from the hydrolysis mixture the resultant compound V, together with any compound III remaining, as a crude organic mixture, and subject such mixture to repeated "alkylation" (Step A) to obtain complete conversion to compound V.

Step C is the conversion of a compound V to its corresponding isothiuronium salt by contacting the compound V with thiourea in a lower alkanoic acid, e.g., glacial acetic acid, under dry conditions, preferably under an inert atmosphere, e.g., nitrogen, at room temperature (20° C.) for from 1 to 4 days. Compound VI is heat sensitive. Hence, it should be recovered, e.g., by extraction and removal of solvent, without heating to over 40° C., and stored with cooling, e.g., at −20° C. Preferably, it is used immediately for Step D, without refining.

Step D, i.e. the condensation of compounds VI and VII is suitably carried out in solvent boiling at at least 75° C., e.g., a mixture of water and t-butylalcohol, at a temperature of from 75° to 180° C., preferably at the reflux temperature of the solvent, over a period of from 6 to 36 hours. The product (compound VIII) is recovered by conventional means, e.g., extraction and removal of solvent and may be refined, e.g., by chromatography.

Alternatively, a compound V may be converted directly to its corresponding compound VIII (Step C'), i.e. obviating the preparation of a compound VI. Step C' may be accomplished by reacting a compound V, i.e. a "vinyl silatetralol", with an appropriate compound VII, i.e. a 2-$R^4$-cyclopentane-1,3-dione, in the presence of mild acid or mild base in an inert solvent boiling at at least 40° C., e.g. t-butanol or xylene by heating at 60° C. to 180° C., preferably at the reflux temperature of the solvent. Suitable mild base is, for example, 1,4-diazabicyclo-[2,2,2]octane, or a tetraalkylammonium hydroxide e.g. benzyl-trimethyl ammonium hydroxide. Suitable mild acid is a (lower) alkanoic acid, such as acetic acid.

Step E is a cyclization and may be carried out in the conventional manner for cyclizing a carbonyl compound, e.g., by heating, at from 75° to 180° C., in the presence of an acid catalyst in an inert solvent which is employed and boils at not lower than 75° C. Preferably, the solvent is one which forms an azeotrope with water, such as benzene or toluene, thus permitting removal of water of reaction from the system. Preferably the acidic agent is an organic sulfonic acid, e.g., p-tolune sulfonic acid.

Illustrative of the preparation of a compound II from an appropriate "silatetralone," i.e. a compound III, is the preparation of the 3-methyl ether of 6,6-dimethyl-6-sila-estra-1,3,5(10),8,14-pentaene-3-ol-17-one from an appropriate "silatetralone", i.e., 1,1-dimethyl-7-methoxy-4-oxo-1,2,3,4-tetrahydro-1-silanaphthalene starting material. Broadly speaking, in this preparation the "silatetralone" is reacted with vinyl magnesium chloride to obtain the corresponding "vinyl silatetralol" which then is reacted with thiourea in acetic acid to form the "isothiuromium salt" via allylic rearrangement. Methylcyclopentanedione is then alkylated with the "isothiuronium salt" in tert-butanol-water to obtain a "secosteroid" which is purified, and then cyclized to the corresponding "silasteroid" in refluxing benzene with p-toluene-sulfonic acid as catalyst and azeotropic removal of water.

The above-mentioned compounds III are obtainable by a multistep procedure, starting with an m-(lower) alkoxphenyl halide and a di(lower)alkyl silicon dihalide, i.e. compounds IX and XI, respectively, which is conveniently In the above-described Reaction Scheme B, Step A, the "alkylation step" involves reaction of a compound III with a vinyl-function-contributing metallo-organic compound (IV) to form a complex which is then hydrolyzed (Step B) to the corresponding compound V. Step A is carried out in a suitable dry reaction medium, e.g., a cyclic ether, preferably tetrahydrofuran (THF) and preferably under an inert atmosphere, e.g., nitrogen. The reactants of Step A are contacted at from +20 to 60° C. 1 to 12 hours, e.g. at +20° C. Compound IV is preferably a Grignard reagent. The usual caution should be exercised in working with organo-metallic compounds, e.g., avoiding any contact with hydroxylic matter, e.g., water; furthermore, gas formed in the reaction could form an explosion mixture.

Step B, i.e. the hydrolysis of the complex resulting from Step A may be carried out in the conventional manner for the hydrolysis of a Grignard adduct, i.e. by slowly adding the reaction mixture containing the complex to a cooled, e.g., 5° to 10° C., saturated aqueous solution of ammonium chloride. The resulting compound V may be recovered in conventional manner, e.g., extraction by an represented by the following Reaction Scheme C wherein $R^1$, $R^2$ and $R^3$ are as defined above; $X^1$ is a halogen atom having an atomic weight of from 80 to 127, i.e. a bromine or iodine atom; each of $X^2$, $X^3$ and "halide" is, independently, a halogen atom having an atomic weight of 19 to 127, e.g., fluorine, chlorine, bromine and iodine; each of $X^4$ and $X^5$ is, independently, a halogen atom having an atomic weight of from 35 to 127, i.e. a chlorine, bromine or iodine atom; each of $M^1$ and $M^2$ is, independently, a metal capable of forming an organo-metallic reagent, preferably magnesium; Z is an alkali metal atom or —$M^1X^1$, where $M^1$ is a divalent metal, and $Z'$ is an alkali metal atom or —$M^2X^4$ where $M^2$ is a divalent metal.

REACTION SCHEME C—PART I

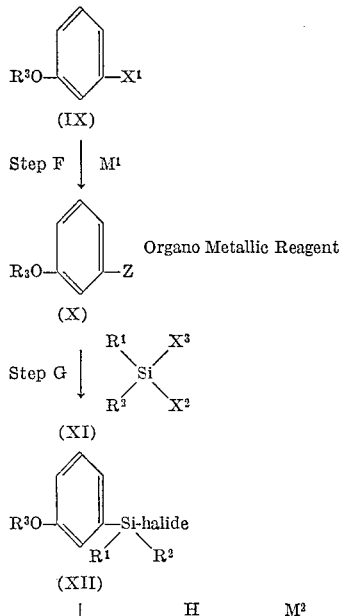

The organo-metallic reagent (compound X) of Reaction Scheme C, above, may be obtained in the conventional manner for the preparation of such compounds. For example, an m-(lower)alkoxyphenyl halide, i.e., a compound IX, may be reacted (Step F) with a metal capable of forming an organo-metallic reagent, preferably magnesium, in an appropriate medium, e.g., THF, under anhydrous conditions at a temperature of from 20° to 60° C. Preferably compound X is prepared and used in an inert atmosphere, e.g. nitrogen, as it is sensitive to oxygen and hydroxylic matter, e.g., water.

A mono-halo di(lower)alkyl aryl silane (compound XII) is obtainable by Step G. In Step G a compound X is contacted with a compound XI, i.e. a di(lower)alkyl dihalo silane, in a molar ratio of from 2 to 8 moles of compound XI per mole of compound X, under anhydrous conditions at a temperature of from 0 to 60° C. in an inert solvent, preferably in an inert atmosphere, e.g., nitrogen. Suitable solvents are inert, non-hydroxylic liquids, preferably the same medium in which compound X is formed, e.g. THF. The excess compound XI is removed and the compound XII produced in Step G is subsenquently reacted with an allyl-contributing organo-metallic reagent, i.e. a compound XIV (Step I) under reaction conditions as described above for Step G, except that the reaction mixture is stirred at 0 to 80° C. for from 12 to 36 hours after admixture of the reactants is completed.

Compound XIV may be obtained, e.g., by treating an appropriate starting material, such as an allyl halide (Step Z) in a similar manner as described in Step F, above.

While the preparation of compound X (Step F) and its reaction with a compound XI (Step G) are described above as separate operations, it is preferable to include compound XI in the reaction mixture in which compound X is formed; thus accomplishing Steps F and G concurrently. It is further preferred to furnish excess metallic compound $M^1$ in Step F, and employ such metallic compound as $M^2$ for Step Z. After removal of excess compound XI, the compound XIV is then reacted without recovery in the same vessel with unrecovered compound XII to yield compound XV. Such contracted procedures advantageously minimize the handling of reactants and products and limit their exposure to moisture.

In Step J, compound XV, i.e. an allyl[m-(lower)alkoxyphenyl]di(lower)alkyl silane, is reacted with cold (0° to 10° C.) $BH_3$·tetrahydrofuran reagent to obtain the corresponding borane (compound XVI) at 0° to 10° C., under anhydrous conditions and an inert gas atmosphere, e.g., nitrogen. The molar ratio of the $BH_3$·THF employed

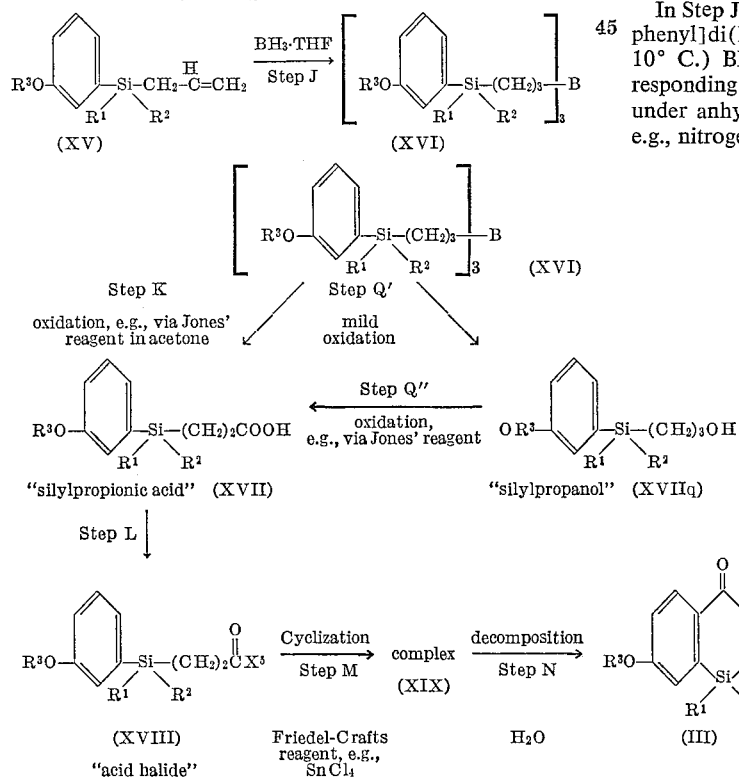

should be such that at least 0.33 equivalents of $BH_3 \cdot THF$ are provided for each mole of compound XV. Preferably an equivalent excess of $BH_3 \cdot THF$ is employed to insure complete reaction, e.g. up to 2 moles of $BH_3 \cdot THF$ per mole of compound XV. The borane is sensitive to heat and hydroxylic matter, e.g., water. THF and residual $BH_3$ are then removed from the reaction mixture by adding a non-hydroxylic, water soluble volatile solvent which is less easily oxidized than THF, e.g. acetone, and vacuum stripping to obtain a concentrate of compound XVI.

In Step K the concentrate of compound XVI obtained in Step J is oxidized to the corersponding compound XVII. Step K is carried out in an organic solvent, which is inert under the reaction conditions and water-miscible and non-hydroxylic, e.g., anhydrous acetone, at low temperatures, e.g., $-10°$ to $+10°$ C., preferably using Jones' reagent as the oxidizing agent.

Jones' reagent is prepared as described in the literature, e.g.: 26.72 g. (0.26 mol) of chromium trioxide is dissolved in 23 ml. conc. sulfuric acid (98%) and with ice cooling and stirring very cautiously diluted to 100 ml. with water.

Preferably, the Jones' reagent and the acetone solution of compound XVI are each precooled to 0° C. and the reaction mixture is maintained at 0° to 5° C. Caution should be exercised as hydrogen gas may evolve from the reaction mixture. After the Jones' reagent is added, the reaction mixture is stirred for an additional 15 minutes, with cooling maintained, then cold isopropanol is added to the reaction mixture to reduce excess Jones' reagent. The resultant compound XVII may be recovered from the reaction mixture by extraction with aqueous base from which it separates on acidification.

Alternatively, a compound XVI may be oxidized (Step Q') to its corresponding "silylpropanol" (compound XVIIq) by mild oxidation, e.g., employing cold hydrogen peroxide (30%) under basic conditions, e.g. in the presence of 3 N sodium hydroxide, preferably the temperature of the reaction mixture is maintained at 0° to 10° C., preferably at 0° C. during mixing and then maintained at 20° to 30° c. for 8 to 24 hours. The resultant compound XVIIq is recovered, e.g., by extraction, and then further oxidized (Step Q") to the corresponding compound XVII, e.g. by the use of Jones' reagent in the manner described above for Step K.

In Step L the "silyl propionic acid" is converted to its corresponding "acid halide" (compound XVIII) in the conventional manner, i.e., by treating with a halogenating agent, e.g., slowly admixing with phosphorus pentahalide in an inert solvent at a low temperature (0° to 10° C., preferably 0° to 5° C.), under anhydrous conditions.

The resultant compound XVIII is then treated with a Friedel-Crafts reagent, e.g., $SnCl_4$ in an inert solvent, e.g., benzene, at a temperature of from 0° to 10° C., preferably 0° to 5° C. (Step M) to obtain a cyclized "complex" (compound XIX) which is subsequently decomposed (Step N) to obtain the corresponding compound III. As both the "acid chloride" and the "complex" are heat sensitive, they are preferably kept cold and further reacted without recovery from their respective reaction mixtures.

Decomposition of the "complex" is accomplished in the conventional manner, e.g., by "drowning" in a cold aqueous buffering solution, e.g., a cold aqueous solution of sodium bicarbonate or Rochelle salt. The resultant compound III is recoverable by conventional means, e.g., by extraction.

Compound III is sensitive to heat, therefore, heating to over 40° C. should be avoided in the recovery thereof.

Illustrative of the preparation of an appropriate "silatetralone," i.e. a compound III, starting from an m-alkoxy-substituted aryl halide, i.e. a compound IX, and a di(lower alkyl)dihalosilane, i.e. a compound XI, is the preparation of 1,1,-dimethyl-7-methoxy - 4 - oxo-1,2,3,4-tetrahydro-1-silanaphthalene, starting from m-bromoanisole and dimethyldichlorosilane. Broadly speaking, in this preparation a Grignard reagent is formed from m-bromoanisole and excess magnesium, and this Grignard reagent in the presence of excess dimethyldichlorosilane forms mostly the monoadduct "chlorosilane." The excess of dimethyldichlorosilane is driven off with solvent. New solvent and some excess of allyl bromide are added, the latter forms a new Grignard reagent with magnesium left over from the previous reaction. The Grignard reagent reacts with the "chlorosilane" to form the "olefin." The reaction mixture is decomposed and worked up in the usual manner for Grignard reactions. The "olefin" is reacted with borane solution, the excessborane is removed while the solvent is replaced by acetone. The mixture is oxidized in the cold with Jones' reagent to the "silylpropionic acid," without isolation of the "silylpropanol" intermediate. The excess oxidant is reduced in the cold with isopropanol. The mixture is worked up by separating inorganic, neutral organic and the "silylpropionic acid" product. The dry "silylpropionic acid" is reacted in the cold with phosphorus pentachloride in dry benzene, to form the "silylpropionic acid chloride." Stannic chloride is added, and the cyclized product separates as a liquid "complex." The whole mixture is decomposed by adding to cold sodium potassium tartrate solution. The "silatetralone" product is separated by extraction.

The reactants, e.g., compounds IV, VII, IX, XI and XIII, and reagents employed in the above-described procedures are either known and can be prepared as described in the literature, or they can be prepared from available materials in analogous manner to that described in the literature for the preparation of the known compounds.

Compounds I have asymmetric carbon atoms; hence, compounds I exist as optical isomers. Resolution of such optical isomers can be effected by conventional means. In some cases greater pharmacological activity or other beneficial attributes may be found with respect to a particular optical isomer; and in such instances, administration of such isomer may be preferred.

The compounds I are useful because they possess pharmacological activity in animals. In particular, such compounds are useful in treating estrogen deficiencies in mammals and in treating menstrual dysfunction in higher primates, as the compounds I exhibit estrogenic activity. The estrogenic activity is indicated by observing the increase of the white mouse uterine weight as described in Endocrinology, 65, 265 (1959).

These compounds may be combined with a pharmaceutically acceptable carrier or adjuvant. They may be administered orally or parenterally. The dosage will vary depending upon the mode of administration utilized and the particular compound employed. However, in general, satisfactory results are obtained when the compounds are administered at a daily dosage of from about 5 milligrams to 20 milligrams. This daily dosage is preferably given in equally divided doses, e.g., 2 to 4 times a day. It will be appreciated by those skilled in the art, that the daily dosage level is independent of body weight. For the larger mammals as well as for smaller domestic mammals dosage forms suitable for internal administration comprise from about 1.25 milligrams to about 10 milligrams of the compound in admixture with a solid or liquid pharmaceutical carrier or diluent.

A representative formulation suitable for oral administration is a tablet prepared by standard tabletting techniques which contains the following:

| Ingredient: | Parts by weight |
|---|---|
| DL-6-sila-6,6-dimethyl-3-methoxy-17β-hydroxy-estra-1,3,5(10),8-tetraene | 2.5 |
| Tragacanth | 2 |
| Lactose | 87 |
| Corn starch | 5 |
| Talcum | 3 |
| Magnesium stearate | 0.5 |

The following examples are illustrative of this inven-

EXAMPLE 1

DL-6-sila-6,6-dimethyl-3-methoxy-17β-hydroxyestra-1,3,5(10),8-tetraene

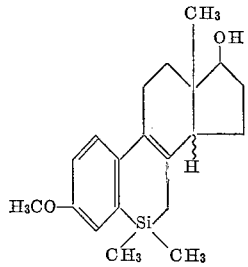

STEP (a)
Allyldimethyl(m-methoxyphenyl)silane

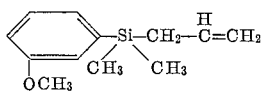

9.36 g. (0.3852 mole) of magnesium turnings and a catalytic amount (20 mg.) of mercuric chloride are placed in a flask which is provided with a dropping funnel, condenser with gas inlet, thermometer, syringe inlet and stirrer.

The apparatus is dried and the air replaced by nitrogen gas. 81.5 g. (0.642 mole) of dimethyldichlorosilane and a catalytic amount (5 mg.) of iodine are placed in the dropping funnel and allowed to flow into the flask. 90 ml. of peroxide-free absolute THF is then added, 24.0 g. (0.1284 mole) of m-bromoanisole is placed in the dropping funnel and up to one third thereof added to the flask with stirring to initiate reaction. The rest of the m-bromoanisole is added an the temperature of the reaction mixture is maintained at 40° by regulating immersion in an ice bath and regulating the rate of addition of the m-bromoanisole. Stirring at 40° C. is continued for 15 minutes after completion of the addition. Stirring is then continued until a sample of the reaction mixture gives a negative Gilman test, while the mixture is maintained at 40° C. (about 15 minutes). Vacuum (14 mm. Hg) is then applied to the system. THF and excess dimethyldichlorosilane are removed (over a period of about 1 hour) while stirring at 20° to 40° C. Under a nitrogen atmosphere 20 ml. of absolute THF is added. Vacuum is again applied to remove the THF and any remaining dimethyldichlorosilane (over a period of about one half of an hour) to obtain a residue of magnesium and sticky matter. 100 ml. of absolute THF is then added to the residue and the mixture homogenized with stirring. 31.2 g. (0.257 mole) of allyl bromide (i.e. 3-bromopropene-1) is added to the homogenized mixture over a period of 60 to 90 minutes (cooling to 40° being maintained). After the addition, the reaction mixture is then stirred at 50° C. for 17 hours.

The reaction mixture is then cooled to 5° and slowly poured into a cooled mixture of 100 ml. of benzene and 250 ml. of saturated aqueous ammonium chloride; after decomposition is complete the organic phase is separated. The apparatus is then rinsed with 100 ml. of benzene which is then used to further extract the aqueous phase and the resulting organic phase is separated. The organic phases are combined, dried over anhydrous sodium sulfate and evaporated at 40° C. under vacuum (14 mm. Hg) to obtain allyl-dimethyl-(m-methoxyphenly)silane as an oily residue (over a period of about one hour), which should be kept dry and held at 0° C. for use in Step (b), below.

A refined sample of the title compound (a) may be obtained by distillation of the oily residue obtained as described above (a), and collecting the main fraction with B.P. 58°–60°/0.06 mm. Hg.

STEP (b)
3-[(m-methoxyphenyl)dimethylsilyl]propionic acid

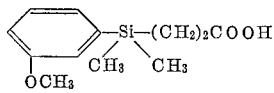

26.4 g. (0.128 mole) of allyldimethyl(m-methoxyphenyl)-silane (obtainable as described above in Step (a) in 300 ml. of absolute, peroxide-free THF, cooled to between 0° and 5° C., is added to 63.7 ml. of a 1 molar BH$_3$·THF solution, i.e. (1.5×0.128 equivalents) with stirring and cooling (ice bath) the temperature being held below 10° C. The resulting mixture is allowed to stand in an ice bath for 15 minutes. The reaction mixture is then allowed to stand at room temperature until the TLC test indicates complete consumption of the allyl-dimethyl-(m-methoxyphenyl)silane; 50 ml. of acetone is then added, and the mixture concentrated at 40° C. and 14 mm. Hg 10 ml. of acetone is then added and the mixture again evaporated to completely remove THF. The resulting concentrated acetone solution is dissolved in 800 ml. of acetone. The solution is cooled to 0° C. 224 ml. of Jones' reagent at 0° C. is added dropwise to the solution with strring and ice cooling (keeping the temperature of the reaction mixture below 5° C.) over about 5 minutes. After addition is completed the stirring and cooling are maintained for 15 minutes. 68.4 ml. (0.895 mole) of isopropanol is added dropwise to the reaction mixture with stirring and cooling so as to keep the temperature below 5° C. (over about 30 minutes). After the addition is completed stirring is maintained for an additional 5 minutes with cooling, then the mixture is concentrated to one third its volume on a rotary evaporator under vacuum at 0° to 10° C. The cooled concentrated mixture is combined with 400 ml. benzene, then with 800 ml. water (all solids dissolving) and the phases separated. The aqueous phase is extracted 3 times with 100 ml. portions of benzene and the extracts combined with the organic phase. The combined organic phases are washed twice with 100 ml. of saturated aqueous sodium sulfate solution, then extratced 5 time with 50 ml. portions of 2 N potassium carbonate. The aqueous extracts are combined, 150 ml. of benzene added and tartaric acid is then added to this mixture to bring the pH thereof to 4 (but not higher), cautiously to avoid over-foaming. The organic phase is separated. The aqueous phase is extracted three times with 50 ml. portions of benzene, (any inorganic solids which separate may be removed by filtration). The organic extracts are combined, washed with 50 ml. of water, dried over anhydrous sodium sulfate, then evaporated under vacuum to obtain 3-[(m-methoxyphenyl)dimethylsilyl]propionic acid as residue.

Distilling the crude title product (b) obtained as described above, and collecting the portion boiling at 108°/0.15 mm. Hg yields a refined sample of the tile compound (b) as a colorless, low-melting solid.

STEP (c)
1,1-dimethyl-7-methoxy-4-oxo-1,2,3,4-tetrahydro-1-silanaphthalene

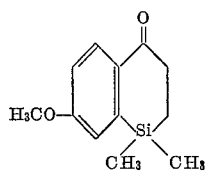

18.2 g. (1.2×72.5 millimoles) of phosphorus pentachloride are placed in a dry reaction flask equipped with a stirrer, thermometer, dropping funnel, condenser and gas inlet. The air in the flask is replaced by nitrogen, 50 ml. of absolute benzene is added to the flask and the mixture cooled to 5° C., 17.25 g. (72.5 millimoles) of 3[(m-methoxyphenyl)dimethylsilyl]propionic acid in 70 ml. of absolute benzene is placed in the dropping funnel and added dropwise at a rate whereby the reaction mixture temperature is maintained at 0° to 5° C. (over a period of about 25 minutes). The dropping funnel is then rinsed with 10 ml. of absolute benzene.

40.4 g. (2.14×72.5 millimoles) stannic chloride (SnCl₄) in 60 ml. of absolute benzene is added from the dropping funnel, with stirring, at a rate whereby the temperature of the reaction mixture is kept below 10° C., i.e. 0° to 5° C. (over a period of about 10 minutes). The dropping funnel is rinsed with 10 ml. of absolute benzene. The resulting "complex" settles as a heavy colored liquid. Stirring and cooling are continued for an additional 5 minutes. The cold reaction mixture is then slowly poured into an ice-cold mixture of 410 g. (20×72.5 millimoles) of sodium-potassium tartrate·4H₂O (Rochelle salt), 1000 ml. of water and 200 ml. of benzene, with vigorous stirring. The pH of the aqueous phase should be no lower than 5 additional sodium-potassium tartrate solution being added if necessary to raise the pH to at least 5. Stirring and cooling are maintained for an additional 5 minutes (just above the freezing point of the benzene phase). The organic phase is separated and solids filtered off. The oragnic phase is washed with 50 ml. of water, dried over anhydrous sodium sulfate and evaporated under vacuum at 40° C. to obtain 1,1-dimethyl-7-methoxy-4-oxo-1,2,3,4-tetrahydro-1-silanaphthalene as residue.

Distillation of the crude title compound described above (c) and collecting the portion boiling at 87° at 0.05 mm. Hg, yields a refined sample of 1,1-dimethyl-7-methoxy-4-oxo-1,2,3,4-tetrahydro-1-silanaphthalene as a low-melting colorless solid.

STEP (d)

1,1-dimethyl-4-hydroxy-7-methoxy-4-vinyl-1,2,3,4-tetrahydro-1-silanaphthalene

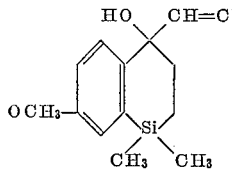

156 ml. of vinylmagnesium chloride solution in THF [1] (0.312 mole) is mixed with 450 ml. of fresh THF and the mixture placed in a dry flask fitted with a stirrer, thermometer, ice bath, dropped funnel and nitrogen inlet. 34.5 g. (0.157 mole) of 1,1-dimethyl-7-methoxy-4-oxo-1,2,3,4-tetrahydro-1-silanaphthalene in 150 ml. of fresh THF is placed in the dropping funnel. The air in the apparatus is replaced by nitrogen. The THF-solution in the dropping funnel is added dropwise to the cooled flask with stirring and at such a rate that the temperature of the reaction mixture is maintained at 5° to 10° C. (over a period of about 30 minutes). The sirred reaction mixture is then allowed to rise to room temperature (over a period of about 45 minutes) and then stirring is continued for 30 minutes. The apparatus is then cooled with the ice bath and then the cooled reaction mixture is cautiously poured into one liter of cooled (ice bath) saturated (about 30%) aqueous ammonium chloride with stirring. The resultant mixture is stirred for one hour, the organic phase is recovered, and the aqueous phase is then extracted with 100 ml. of benzene. The organic phases are combined, washed three times with 50 ml. portions of saturated aqueous sodium chloride, dried over anhydrous sodium sulfate and evaporated under vacuum to obtain an oily residue.

Using apparatus as described above, the resultant oily residue is then subjected to a second Grignard treatment as follows: the oily residue in 150 ml. of fresh THF is mixed with 78 ml. of the above-mentioned commercial vinylmagnesium chloride-THF solution in 450 ml. of fresh THF, with stirring at 5° C. over a period of 20 minutes. The stirred reaction mixture is allowed to rise to room temperature (over about 45 minutes) and stirring is continued for an additional 30 minutes. The reaction mixture is then cautiously worked up as described in the first part of this Step (d) to obtain the "second treated" 1,1-dimethyl-4-hydroxy-7-methoxy-4-vinyl-1,2,3,4-tetrahydro-1-silanaphthalene as an oily residue, which shows no carbonyl absorption on IR examination.

STEP (e)

S-[2'-(1,1-dimethyl-7-methoxy-1,2,2,4-tetrahydro-1-silanaphth-4-ylidene)-ethyl]isothiuroium acetate

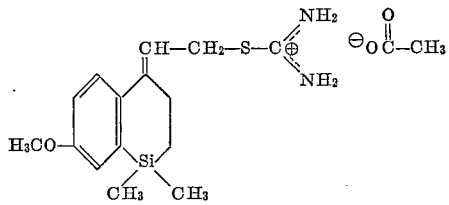

15.5 g. (0.204 mole) of thiourea is mixed with 350 ml. of glacial acetic acid and the resultant mixture added at room temperature to 42.8 g. of the oily "second treated" 1,1-dimethyl-4-hydroxy-7-methoxy-4-vinyl-1,2,3,4-tetrahydro-1-silanaphthalene, obtainable as described in Step (d) above, which oil contains 39 g. (0.157 mole) of 1,1-dimethyl-4-hydroxy-7-methoxy-4-vinyl-1,2,3,4-tetrahydro-1-silanaphthalene. Air in the flask is then replaced by nitrogen and the mixture allowed to stand for two days. The acetic acid is then removed from the reaction mixture under vacuum (14 mm. Hg) at 35° C. to obtain an oily residue which is first treated 5 times with 50 ml. portions of pentane, and the pentane-insoluble residue then subjected to high vacuum to obtain S-[2'-(1,1-dimethyl-7-methoxy-1,2,3,4-tetrahydro-1-silanaphth-4-ylidene)-ethyl]isothiuronium acetate as an oily residue, which is promptly used without further refining in Step (f), below.

STEP (f)

1,1-dimethyl-4-[2'-(1'',3''-dioxo-2''-methyl-cyclopenta-2''-yl) ethylidene[-7-methoxy-1,2,3,4-tetrahydro-1-silanaphthalene

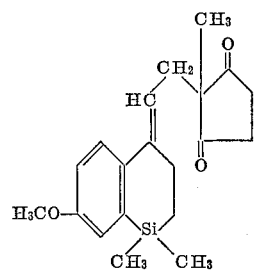

180.7 g. (containing 0.15 mole) of the isothiuronium salt obtained in Step (e) (without further purification) is placed in a flask equipped with a stirrer, condenser and nitrogen inlet, and 150 ml. of water, 900 ml. of tertiary-butanol and 68.1 g. (0.61 mole) of 1-methylcyclopentane-2,5-dione added thereto. The air in the apparatus is replaced by nitrogen. The mixture in the flask is refluxed for 19 hours, then cooled, and the tertiary-butanol removed under vacuum leaving an aqueous residue. To the aqueous residue is added 700 ml. of benzene. Any solid 1-methylcyclopentane-2,5-dione is removed by filtering. 300 ml. of 2 N sodium carbonate solution is then added. The mixture is shaken and the organic layer is recovered, washed five times with 100 ml. portions of 2 N sodium carbonate solution, then three times with 50 ml. portions of saturated aqueous sodium chloride solution. The organic solution is dried over anhydrous sodium sulfate and then evaporated under vacuum to obtain

[1] Supplied by Columbia Organic Chemical Co. Inc., Columbia, S.C.

an oily residue. The oily residue is dissolved in 200 ml. of benzene and passed through a silica gel column (1.5 x 17 inches), followed by a 800 ml. benzene rinse and the major portion of the benzene rinse collected. The colored impurities remain on the column. The benzene solution is evaporated under vacuum to obtain 1,1-dimethyl-4-[2'-(1'',3''-dioxo-2''-methyl-cyclopenta-2'' - yl) ethylidene] - 7-methoxy-1,2,3,4-tetrahydro-1-silanaphthalene, which is used as the "secosteroid" in Step (g), below.

STEP (g)

DL-6-sila-6,6-dimethyl-3-methoxyestra-1,3,5(10),8,14-pentaene-17-one

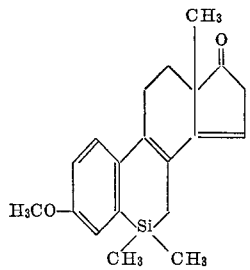

To a flask equipped with a stirrer, thermometer, dropping funnel, rubber stopple for taking samples by syringe, Dean-Stark water trap (separator), a reflux condenser, gas inlet and oil bath, are added 1.4 g. of p-toluenesulfonic acid hydrate, 500 ml. of benzene. The air in the apparatus is then replaced by nitrogen. Water is removed from the system by refluxing and collected in the trap. 40.2 g. of the "secosteroid" (prepared as described above without further refining), dissolved in 100 ml. of benzene and 10% of the solvent is gently boiled away to remove any water present, then placed in the dropping funnel. The solution in the dropping funnel is added to the refluxing solution in the flask over a period of about one hour, water formed in the cyclization being removed by the trap. The refluxing is continued for about 22 hours, until the cyclization is complete as indicated by ultraviolet spectrum of the product, i.e. until a peak at 308 mμ fails to increase ($\lambda_{max}$ 308, $\epsilon$=21,500, in acetonitrile). The reaction mixture is cooled, washed 3 times with 50 ml. portions of saturated sodium bicarbonate solution, and then washed three times with 50 ml. portions of water by stirring rapidly being careful to avoid inclusion of air as the product is sensitive to oxygen when the base is present. The washed layer is dried over sodium sulfate, then concenrated under vacuum from the bath at 40° C. to obtain an oily residue. The oily residue is crystallized by triturating with 70 ml. of ethanol:water (95:5) and cooling yielding DL-6-sila-6,6-dimethyl-3-methoxyestra-1,3,5(10),8,14 - pentaene - 17 - one; M.P. 92° to 101° C.

STEP (h)

DL-6-sila-6,6-dimethyl-3-methoxy-17β-hydroxyestra-1,4,5(10),8,14-pentaene

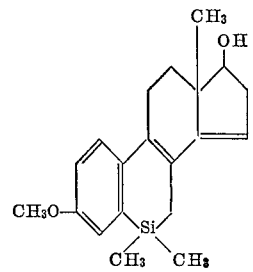

An amount of 53.3 g. (164.5 millimoles) of DL-6-sila-6,6 - dimethyl - 3-methoxyestra-1,3,5(10),8,14-pentaene-17-one is dissolved in a mixture of 250 ml. of toluene and 250 ml. of methanol. The solution is cooled to — 60° C. under nitrogen, then 6.21 g. (164.5 millimoles) of sodium borohydride is added with stirring. The solution is allowed to warm to —20° C. over a period of 35 minutes and stirred at —20° C. for 30 minutes. Then it is allowed to warm up to room temperature over a period of 1.5 hours.

The solution is cautiously acidified with a slight excess (approximately 50 ml.) of acetic acid under ice cooling. The resulting liquid after 15 minutes of stirring is concentrated in vacuo, from a bath at 40° C., to an oil. The latter is taken up in benzene (approximately 500 ml.), the benzene solution is washed once with 300 ml. of water and 3 times with 50 ml. portions of brine, dried with anhydrous magnesium sulfate, filtered and concentrated in vacuo to obtain DL-6-sila-6,6-dimethyl-3-methoxy-17β-hydroxyestra-1,3,5(10),8,14-pentaene as an oil. This oil is of sufficient purity for carrying out the next Step (i).

STEP (i)

DL-6-sila-6,6-dimethyl-3-methoxy-17β-hydroxyestra-1,3,5(10),8-tetraene 100 mg. of 5% palladium on calcium carbonate catalyst in 8 ml. of ethanol is prehydrogenated. With rapid stirring, 46.5 mg. of DL-6-sila-6,6-dimethyl-3-methoxy-17β-hydroxyestra - 1,3,5(10),8,14-pentaene, obtained as described in Step (h) above, is added. Rapid stirring is continued for 2 minutes, after which hydrogen uptake essentially ceases. The catalyst is filtered off, washed, and the filtrate is concentrated in vacuo to obtain DL-6-sila-6,6-dimethyl-3-methoxy-17β-hydroxyestra - 1,3,5(10),8-tetraene as a colorless oil.

EXAMPLE 2

3-[(m-methoxyphenyl)dimethylsilyl]propanol

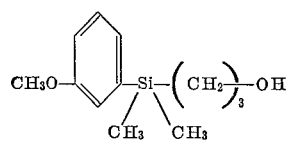

1 g. of crude allyldimethyl(m-methoxyphenyl)silane (obtainable as described in Step (a) of Example 1, above) is dissolved in 50 ml. of absolute, peroxide-free THF, cooled to between 0° and 5° C. and 2.5 ml. of a 1 molar BH$_3$·THF solution is added thereto, with stirring and cooling (ice bath); the temperature being maintained below 10° C. The resulting "hydroboration" mixture is then allowed to stand 15 minutes in an ice bath. TLC test is made on the reaction mixture. The mixture is allowed to stand at 20° C. until no spot is obtained for starting material in the TLC test, and then the reaction mixture cooled to 0° C.

A 3 N solution containing 0.181 g. of sodium hydroxide is prepared, cooled to 0° C. and mixed with 1.65 ml. of cold 30% aqueous solution of hydrogen peroxide. The resulting cold sodium hydroxide-hydrogen peroxide solution is then carefully added to the cold "hydroboration" solution with vigorous stirring at 0° C. The reaction mixture is then allowed to warm to 25° C., and maintained at that temperature for 18 hours with stirring. An equal volume of water is added to the reaction mixture and the THF is removed vacuum leaving an aqueous mixture. The aquouse mixture is extracted thrice with benzene, the combined benzene extracts washed twice with saturated aqueous sodium chloride, then dried over anhydrous sodium sulfate, then evaporated under vacuum, to obtain 3-[m-methoxyphenyl)dimethylsilyl]-propanol as an oily residue, which may be refined to distillation; the product collected as the fraction boiling at 95° to 108° C. at 0.12 mm. (Hg).

3-[(m-methoxyphenyl)dimethylsilyl]propanol may be oxidized to 3-[(m-methoxyphenyl)dimethylsilyl]propionic acid by use of Jones' reagent, in slightly reduced proportion, as described in Step (c) of Example 1.

3-[(m-methoxyphenyl)dimethylsilyl]propanol may alternatively be prepared as described above except using an ice-cold mixture of 1 ml. of triethylamine and 1 ml. of

EXAMPLE 3

DL-6-sila-6,6-dimethyl-3-methoxy-17β-hydroxyestra-1,3,5(10),8-tetraene

STEP (a)

DL-6-sila-6,6-dimethyl-3-methoxyestra-1,3,5(10),8-tetraen-17-one

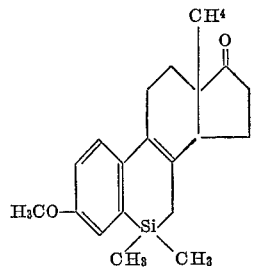

DL - 6 - sila-6,6-dimethyl-3-methoxyestra-1,3,5(10),8,14-pentaene-17-one is hydrogenated using the same proportion of catalyst and in the same manner as described in Step (i) of Example 1 to obtain DL-6-sila-6,6-dimethyl-3-methoxyestra-1,3,5(10),8-tetraen-17-one.

STEP (b)

DL-6-sila-6,6-dimethyl-3-methoxy-17β-hydroxyestra-1,3,5(10),8-tetraene

Carrying out the reduction described in Step (h) of Example 1, but replacing the DL-6-sila-6,6-dimethyl-3-methoxyestra-1,3,5(10),8,14-pentaene-17-one used therein with an equivalent amount of DL-6-sila-6,6-dimethyl-3-methoxyestra-1,3,5(10),8-tetraen-17-one, obtained as described in Step (a), above, yields DL-6-sila-6,6-dimethyl-3-methoxy-17β-hydroxyestra-1,3,5(10),8-tetraene.

What is claimed is:

1. A compound of the formula

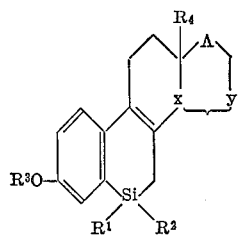

wherein:
  each of $R^1$, $R^2$ and $R^3$ is, independently, lower alkyl;
  $R^4$ is alkyl having from 1 to 3 carbon atoms;
  A is either

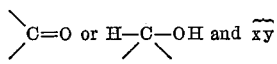

signifies

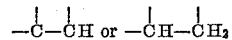

2. A compound of claim 1 wherein A is

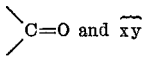

signifies

3. The compound of claim 2 which is 6-sila-6,6-dimethyl-3-methoxyestra-1,3,5(10),8,14-pentaene-17-one.

4. A compound of claim 1 wherein A is

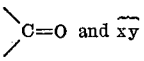

signifies

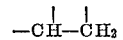

5. The compound of claim 4 which is 6-sila-6,6-dimethyl-3-methoxyestra-1,3,5(10),8-tetraen-17-one.

6. A compound of claim 1 wherein A is

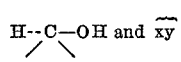

signifies

7. The compound of claim 6 which is 6-sila-6,6-dimethyl - 3 - methoxy - 17β-hydroxyestra-1,3,5(10),8,14-pentaene.

8. A compound of claim 1 wherein A is

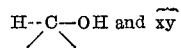

signifies

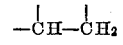

9. The compound of claim 8 which is 6-sila-6,6-dimethyl - 3 - methoxy - 17β - hydroxyestra-1,3,5(10),8-tetraene.

References Cited

UNITED STATES PATENTS 3,215,718  11/1965  Ryan _____ 260—448.2
3,345,393  10/1967  Simmler et al. ____ 260—448.2

HELEN M. McCARTHY, Primary Examiner
W. F. W. BELLAMY, Assistant Examiner

U.S. Cl. X.R.
424—184